May 4, 1965 D. C. BEATTY 3,182,137

GAIN-ADJUSTING AUDIO LEVEL TERMINATOR

Filed Aug. 2, 1961 2 Sheets-Sheet 1

INVENTOR

DONALD C. BEATTY

BY Frederick A. Zoda

ATTORNEY

GAIN-ADJUSTING AUDIO LEVEL TERMINATOR
Filed Aug. 2, 1961 2 Sheets-Sheet 2
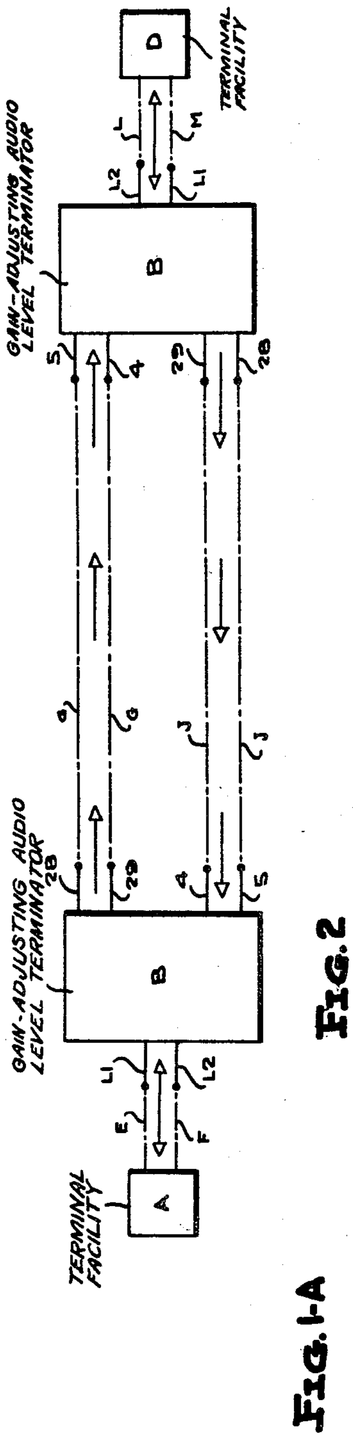
FIG. 2
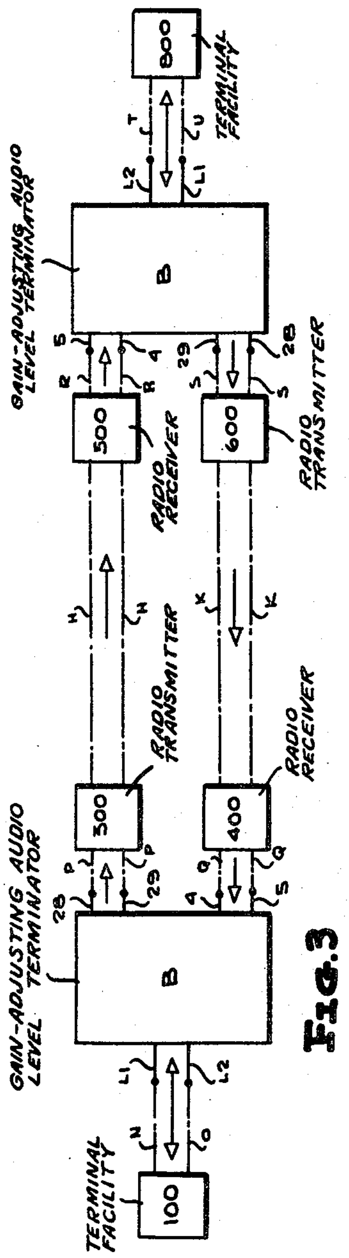
FIG. 3
FIG. 4
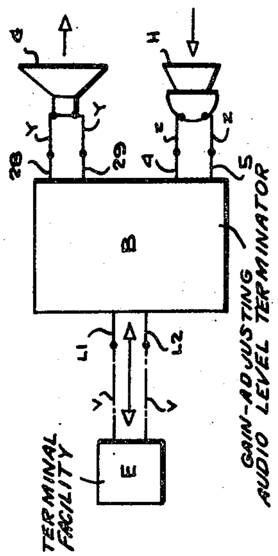
FIG. 1-A
INVENTOR
DONALD C. BEATTY
BY Frederick A. Zoda
ATTORNEY United States Patent Office 3,182,137

Patented May 4, 1965

3,182,137

GAIN-ADJUSTING AUDIO LEVEL TERMINATOR

Donald C. Beatty, 2800 Overhill Road, Birmingham 9, Ala.

Filed Aug. 2, 1961, Ser. No. 129,211
10 Claims. (Cl. 179—170.8)

This application is a continuation-in-part of my copending application Serial No. 63,387, filed October 18, 1960, and now abandoned.

In communication circuits, whether of the metallic conductor type or of the type designed for radio propagation and reception, improvement of the transmitted and received signal is needed, particularly where the circuits are closely associated, both physically and electrically, and where the distance between the points of communication increases. Attempts have been made to receive, amplify and retransmit impulses without simultaneously injecting into the circuits detrimental, non-signal impulses such as "white noise" and other types of static.

One apparatus, currently in extensive use, is the so-called repeater or bi-directional amplifier. This is usually in the form of similar uni-directional amplifiers, electrically associated with one another and with a particular communication circuit. One or more multi-coil, hybrid-type transformers generally provide the necessary electrical association.

A hybrid-type transformer, however, has definite limitations. One limitation is oscillatory "sing" or "howl" resulting from circuit saturation or unbalance. This develops when voltage above a certain magnitude is induced into each coil winding. The inability to reject unwanted voltages permits development of a "singing point," with simultaneous electrical saturation of associated circuits. This is so because the unwanted voltage from the output of one amplifier is delivered to the input of the other amplifier. The inability of the hybrid to reject the unwanted voltage permits the second amplifier to amplify that energy, and again return it to the input of the first amplifier. The cycle is then repeated, and continues in ever-increasing magnitude until electrical saturation is reached. Oscillatory "sing" or "howl" then results and continues indefinitely. In telephone communications circuits where such apparatus is commonly used, it is necessary to restrict the gain of the associated amplifiers to a low magnitude to prevent this undesirable condition.

One means of overcoming this characteristic is the 4-wire communication circuit. This has independent "sending" and "receiving" paths, one or out-bound impulses and one for in-bound. However, since these paths must be connected to the same two-conductor communication circuit, for example a telephone circuit, current flowing in one path should be ineffective upon the other.

The connection for 4-wire to 2-wire circuits is referred to as a "2-wire to 4-wire terminating facility." Hybrid-type transformers, with their compromise networks for circuit impedance matching, generally form a major part of such equipment. The undesirable characteristics of the hybrid are ever present, however.

It is a general object of this invention to improve metallic conductor and radio propagation communications circuits by the elimination of the deficiencies cited.

To this end, the invention is connectable to a communication circuit, and includes a means selectively adjustable by the user to exclude all incoming signal impulses below a predetermined value measured in decibels, and to accept only those impulses above said value. The invention is designed, when so adjusted, to receive the acceptable signal impulses, amplify them and retransmit them into other communication circuits. Excluded impulses, comprising "white noise," "crackle," "pop," and other spurious noises, remain excluded in the absence of the acceptable, voice level signals. In the presence of acceptable signals, the spurious noises are admitted along with the voice level signals of greater magnitude. However, because the signals of intelligence are greater in magnitude than the spurious noise, the spurious noise consequently is obscured and completely "covered over" by the louder signals of intelligence. To the person at the distant telephone, the end result to him is the reception of signals of intelligence without interference by spurious noises.

The invention, in addition to a power supply, includes seven sections. These are: (A) an input-output line impedance matching network; (B) a receiving amplifier; (C) an automatically controlled transmitting amplifier; (D) a rectifying section for automatic gain control of the receiving amplifier; (E) a rectifying section for automatically controlling the gain of the transmitting amplifier to provide a substantially constant signal energy output value; (F) an input rectifying section for attenuation of the transmitting amplifier; and (G) a rectifying section for attenuation of the receiving amplifier.

One object is to permit a swift, easy reading of the level to which "white noise" is rising in the "receive" circuit, followed by an equally facile manual adjustment effective to permit amplification of only those received impulses that are above said level, thus to deny admission to undesirable non-signal impulses at the "threshold," so to speak, of the receiving amplifier.

Another object is to permit selective, normal, manual volume adjustment of the received signal, after it is freed of detrimental impulses as described above. Thus, it is proposed to not only provide a novel and improved means of generally restricting received impulses to those which are classed as signal-type, but to also provide for amplification of the signal to any desired magnitude, as distinguished from the low gain necessary when bi-directional amplifiers having multi-coil, hybrid-type transformers are used.

Another object is to provide a gain control arrangement for the transmitting amplifier which will automatically respond to changing levels in the volume of voice or other sounds input thereto, in a manner effective to continually adjust the gain to produce a substantially constant level at the output side of the transmitting amplifier.

A further object is to obtain these desirable characteristics while providing a highly compact terminating facility the physical dimensions of which are substantially smaller than those of other facilities heretofore devised for the same purpose.

Other objects will appear from the following description, the claims appended thereto, and from the annexed drawing, in which like reference characters designate like parts throughout the several views, and wherein:

FIGURE 1A is a schematic view of a conventional power supply usable with the invention;

FIGURES 2 and 3 are block diagrams depicting the invention in conjunction with metallic conductor and radio propagation communication circuits, respectively; and FIGURE 4 is a block diagram depicting the invention as part of a loudspeaking telephone device in conjunction with an ordinary metallic two-conductor telephone circuit.

Figure 1:
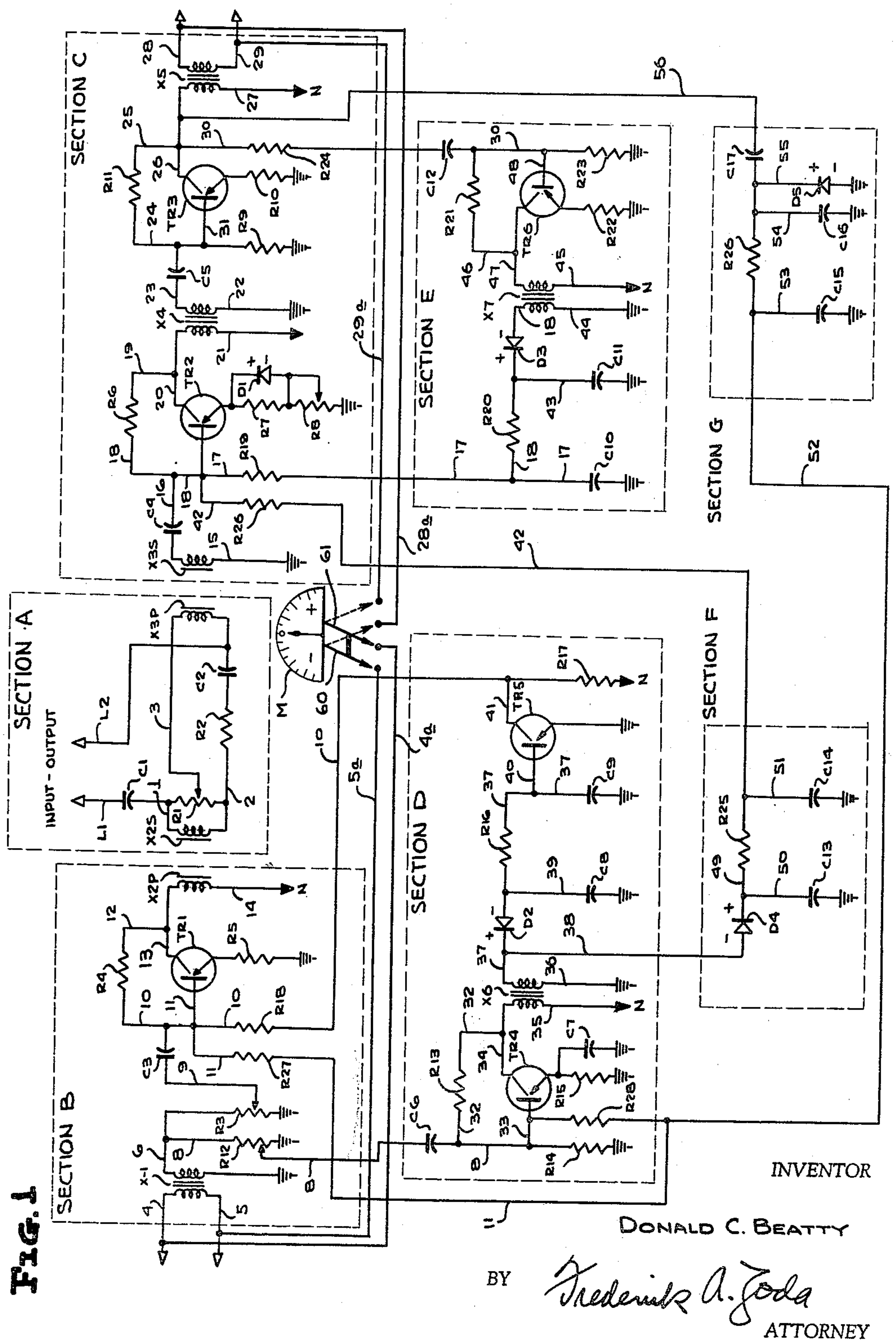
FIGURE 1 is a schematic representation of the invention.

Referring to FIGURE 2, rectangles A and D illustrate the terminal points of a communication circuit, an ordinary telephone switching office for example, while the larger rectangles B represent the invention, one at each terminal point. Duplicate 2-conductor metallic circuits E–F, and L–M connect the terminal points with the adjacent devices B. The 4-conductor circuit, depicted as connecting two like apparatuses B, is illustrated by dashed lines G—G, J—J.

FIGURE 3 illustrates the invention in communication circuits arranged for radio propagation and reception. Rectangles 100–800 depict the terminal points of such a circuit and the larger rectangles B, B illustrate the invention located at those terminal points. The dashed lines N–O and T–U show each terminal point of the circuit, an ordinary telephone switching office for example, connected with the invention. The rectangles 300–600 illustrate radio propagation transmitters metallically connected to the devices B by conductors P—P and S—S respectively. The rectangles 400–500 illustrate radio propagation-receiving equipment metallically connected to the invention by conductors Q—Q and R—R respectively. Radio channels depicted by dashed lines H—H and K—K represent the radio propagation-reception affiliation between the terminal points of the communication circuit.

As used in this application, the term "transmitting and receiving channels" will be understood as including both metallic conductors G, G and J, J and radio propagation H, H and K, K.

FIGURE 4 shows the invention used in communication circuits as a part of a loudspeaking telephone device. The rectangle E illustrates a terminal point of the circuit, an ordinary telephone switching office for example, while the larger rectangle B represents the invention, located at the other terminal of such a circuit. Duplicate metallic conductors Y—Y and Z—Z (these are transmission and receiving channels in the sense of the term as used herein) illustrate a means of connecting a loudspeaker G and a microphone H with the adjacent invention.

It is believed sufficiently obvious as not to require special illustration that the apparatus shall be connected to appropriate communication circuits, and that proper electric power shall be provided.

The descrption of the apparatus which follows will be divided into seven general sections or phases. Each will be primarily concerned with one of the seven major functional areas of the invention, viz, Section A through Section G.

SECTION A

*Line Matching Network*

Referring to FIGURE 1, L–1 and L–2 are leads connectable to conductors E–F and M–L of FIGURE 2, N–O and U–T of FIGURE 3, or V, V of FIGURE 4, depending upon the particular application of the invention. There is thus provided a connection with a typical terminal facility A, D, E, 100, or 800, said facility including an ordinary telephone loop circuit, a telephone switching office, and a telephone instrument. Extending from a connection with such facility, a closed electrical circuit may be traced as follows: Lead L–1, series-connected condenser C1, one terminal each of resistor R1 and lead 1, the other terminal of that lead to one terminal of the secondary winding X2S of coupling transformer X2P–X2S, the other terminal of that winding to a joint connection with resistor R1 and lead 2, the latter extending to one terminal of resistor R2 and from the other terminal thereof to condenser C2 to a joint connection with the lead L2 and one terminal of winding X3P of coupling transformer X3P–X3S. The other terminal of X3P has the lead 3 connected therewith which extends to an adjustable center contact connection with the resistor R1. The lead L–2, from its aforementioned connection with one terminal of C2 and X3P, may then continue to a connection with the aforementioned telephone loop circuit, not shown, to complete and close the circuit. These leads, connections, and components arranged as described form the balancing and impedance matching network.

This balancing network, considered per se, is similar in many respects to that in Patent No. 2,786,099, issued to me March 19, 1957, and to the network depicted in my co-pending application, Serial No. 63,387, filed October 18, 1960. By my arrangement of components of selected electrical value, electrical circuit balance and impedance matching is accomplished, and the oscillatory type "feedback" usually recognized as "sing" or "howl" is eliminated. This is so because electrical impulses invariably attempt to follow paths of the least electrical resistance. The invention provides such circuit paths and in so doing associated circuits and components do not become saturated to an oscillatory type "singing point." For example, electrical impulses output from transistor TR–1 of Section B, follow such a minimum resistance path. These impulses are induced into secondary winding X2S of coupling transformer X2P–X2S from the primary winding X2P and subsequently flow along the following paths: one terminal of X2S, lead 1, lead L–1, condenser C1, lead L–1 to a connection with one side of a telephone loop circuit, not shown, and from the other side of that loop circuit, lead L–2, lead 2, condenser C2, resistor R2, lead 2 to the other terminal of X2S to complete and close the circuit.

By reference to the drawing it will be seen that resistor R1 is in shunt across the secondary winding X2S of coupling transformer X2P–X2S. To one terminal each of X2S and R1 is connected the lead L1 which, as previously described, may continue on to a connection with one side of a telephone loop circuit. To the other terminals of X2S and R1 is connected lead 2 which, with resistor R2 and condenser C2 in series connection, continues on to a joint connection with lead L2 and one termial of X3P, the primary winding of coupling transformer X3P–X3S. To the other terminal of X3P is connected the lead 3 which terminates in a connection with the midpoint adjustable contact of the variable resistor R1. The lead L2 may continue on to a connection with the other side of the telephone loop circuit as previously described.

Electrical impulses conducted to R1 over the connecting leads from X2S will attain only a minimum value at the adjustable midpoint connection with the lead 3, because of the combination resistive and self-cancelling effect of the midpoint connection. Such a circuit offers a path of greater electrical resistance to the flow of electrical impulse energy than does the path of lesser resistance described in the preceding paragraph. Such energy, induced from X2P to X2S, will therefore follow the previously described least resistive path, and will have little effect upon coupling transformer X3P–X3S.

With respect to impulses input via leads L–1 and L–2, the minimum electrically resistive path is from a telephone or other impulse energy generating device, a telephone or similar switching office, one side of a telephone loop circuit, lead L–1, condenser C1, one terminal of resistor R1 to its adjusted midpoint connection with lead 3 and via that lead to one terminal of the primary winding X3P of coupling transformer X3P–X3S, the other terminal of that winding, lead 2, lead L–2, to the other side of the loop, to thus close the circuit.

SECTION B

*Receiver or "input" amplifier*

Except when responding to the gain control action of Section D, this amplifier attenuates, to a selected value, all electrical energy input thereto via leads 4 and 5.

Impulses input via leads 4 and 5 to the primary winding of transformer X–1 will be induced into the secondary winding. Such energy will then follow a path as follows: common ground, one terminal of the secondary winding of X1, the other terminal of that winding, lead 6 to one terminal of variable resistor R3 which has its other terminal connected to the common ground, the adjustable contact of R3, lead 9, condenser C3 to a common connection with leads 10, 11 and the base element of transistor TR–1, and from the collector element of that transistor via lead 13 to one terminal of the primary winding X2P of coupling transformer X2P–X2S, the other terminal of the primary winding of X2P being connected by lead 14 to the negative side of the common power supply of the apparatus. The emitter element of TR–1 has the resistor R5 connected between it and the common ground. The resistor R4 has been placed in shunt connection between the collector and base elements of TR–1 by means of the connecting leads 10, 11, 12 and 13.

The lead 10, with resistors R17 and R18 in series connection, extends from the base element of TR1 to the common negative power supply. The electrical values of these resistors have been selected to normally maintain transistor TR–1 in a partially conducting or sub-normal amplifying condition at all times, except when responding to the gain control action exercised over that transistor by Section D. By my arrangement TR–1 is held in a condition of near electrical saturation and only partially operative, as opposed to being completely inoperative, and it will respond by changing from a semi-conducting to a normal and fully amplifying condition simultaneously with the exercise of gain control action by the Section D arrangement.

With respect to the "threshold" control action designed into the receiving amplifier, this function is discharged by resistor F–12. A volume unit reading is taken with a meter M, across leads 4 and 5. The meter in general serves as a reference level of the magnitude of impulses in a circuit with the 0 point of the meter located in its center serving as the reference level. This indicates no precise electrical quantity, the meter being calibrated to read 0 v.u. (volume units) on 1 milawatt of 1000 cycle power dissipated in a 600 ohm line (resistance). To the left of the 0 is found the minus side and to the right the plus. Normal speech of a loud talking person over a good telephone circuit will average about minus 18 or minus 20 v.u.; 0 v.u. will therefore be seen to be a very loud signal or impulse.

Assume that the operator takes a reading across leads 4 and 5 and obtains a v.u. reading of minus 35 during times when signals of intelligence are not present over those leads. The −35 v.u. would then indicate the level of static or "white noise" present in the communication circuit.

Ascertaining the v.u. level of the white noise, the operator then adjusts manually operable R–12, the variable resistor which serves as a *threshold* control. This would be adjusted to a minus 30 v.u. which will prevent the Section D arrangement from amplifying any signal *weaker* than −30, as for example the white noise level of −35 because that level is 5 v.u. weaker than the adjusted R–12 setting for minus 30.

R–12 serves as the *threshold* control therefore and will exclude from amplification any signal weaker than the selected minimum value to which it has been adjusted.

The variable resistance or gain control R–3 functions as a normal volume control. Signals of greater magnitude than the minimum value established by the adjusted R–12 will therefore be amplified by TR–1 and emitted into Section A circuitry. The magnitude of these emitted signals is dependent upon the R–3 volume control setting.

It will be noted, in this regard, that the meter would be mounted on the control panel of the apparatus, and would be controlled by a switch in such a way that a volume unit reading can be taken not only across leads 4 and 5, but also across the output leads 28, 29 of the transmitting amplifier (Section C). There could of course be separate meters for Sections B and C, but for maximum compactness and simplicity of the control panel, the arrangement of FIGURE 1 can be used. As shown, leads 4*a*, 5*a*, extend from the meter to leads 4, 5 respectively. Leads 28*a*, 29*a* similarly extend from the meter to leads 28, 29 respectively. The terminals of the meter are connected to conjointly movable switch arms 60, 61. In one extreme position, these engage stationary contacts of leads 4*a*, 5*a*. In another extreme position, shown in dotted lines, the switch arms engage contacts provided upon leads 28*a*, 29*a*. In a middle position, the switch arms do not engage any of the contacts, and the meter is thus turned off.

SECTION C

*Transmitting or "output" amplifier*

Section C, FIGURE 1, depicts the transmit or "output" amplifier which, with the exception cited below, is basically a two-stage audio amplifier. This enables the reception of signal energy conducted to that amplifier via Section A from the ordinary 2-wire telephone loop circuit, for example, and to then amplify, or attenuate such energy to a selected and automatically maintained output value for re-transmission at that arranged value into other associated communications circuits.

Section C accepts usable signal input energy from Section A whether such energy is of small or large value (weak or strong signals) and will amplify or attenuate the same to a selected and automatically maintained value for re-transmission over an associated communication circuit.

When considering the optimum requirements of communication circuits, and particularly those used in conjunction with radio propagation and reception devices, it is known that signal energy input to the radio transmitter should be maintained at a constant, substantial value. To do so assures proper modulation of the input energy by the appropriate section of the transmitter, thus improving the overall quality of the final signal emitted therefrom. Should the input signal energy to the radio transmitter be otherwise, improper modulation with inferior final signal energy emission would result. To prevent such a condition, I have provided Section C and other associated means, to enable the maintenance of a constant and substantial signal energy output value into an associated communication circuit, the terminals of which are connected to leads 28–29 extending to the secondary winding of my output transformer X5. Thus, leads 28, 29 extend to a connection with conductors Y, Y of FIGURE 4, G, G of FIGURE 2, or P, P of FIGURE 3, depending upon the particular application.

Alternating current input energy appearing in the leads L1 and L2 of Section A is conducted to coupling transformer X3P–X3S and then induced into the secondary winding X3S. The energy is then amplified by transistor TR2 and induced into the secondary from the primary winding of coupling transformer X4. The energy is further amplified by transistor TR3, emitted from its collector element and subsequently induced into the secondary or output winding of coupling transformer X5 for conduction via leads 28–29 to the associated communication circuit. A selected portion of the amplified energy from TR3, having direct ratio to the total output from that transistor, is conducted by lead 30 to transistor TR6 for additional amplification. The output from TR6 is conducted by lead 47 to coupling transformer X7 where it is induced into the secondary winding from the primary. The induced energy is thereupon rectified to positive direct current/voltage by diode D3, filtered and further stabilized by the filter network components condensers C10, C11 and resistor R20 and conducted to the base element of TR2 via lead 17 and the series-connected limiting resistor R19.

It becomes apparent then that as the output from TR3 increases or decreases in magnitude, a greater or lesser amount of positive direct current/voltage, in an arranged ratio to the magnitude of the output from TR3, will be conducted and applied to the base element of TR2. Application of positive D.C. to the base element decreases the sensitivity of that transistor and causes partial attenuation of its output. Since the magnitude of the energy input to TR3 is thus controlled, the total amplification or gain of Section C is therefore automatically maintained at a selected constant value, without regard to the magnitude of the usable signal energy input via Section A to Section C.

As a means of selecting the magnitude of the constant value output, I have provided a gain selecting control in the form of a fixed resistor R7 and variable resistor R8 connected between the emitter element of TR2 and the common ground with the diode D1 placed in shunt connection across R7. By Sections A, C, and E, therefore, all signal energy greater than that of a selected minimum value, input from leads L1–L2 into Section C, will be amplified or attenuated as required so as to automatically maintain a selected magnitude or value of the output into the leads 28 and 29.

Diode D1 aids Section E in controlling the gain of transistor TR2. For example, a low level input signal of minus 40 db will cause little electrical change in the resistive value of D1. With low level inputs the diode will continue to maintain its normal low resistance shunt (about 40 ohms) across resistor R7 (about 1500 ohms) which, in effect, electrically removes that relatively high resistance from the circuit because of the short circuit shunt connection. The resistance of these two components in parallel circuit under such conditions will approximate 38 ohms at the time.

The total of the resistance value of the R7–D1 parallel circuit combination plus the resistance of a selected portion of series-connected R8 permits maximum gain from TR2. Such maximum gain in the low level input signal when further amplified by TR3, will cause it to appear at leads 28–29 as a high level signal of approximate zero db.

Section E begins functioning whenever signal impulses of a value greater than minus 40 db are input to Section C from Section A. With the input of such greater value impulses, which is usually the case, a portion of the output of TR3 is amplified by transistor TR6 of Section E; rectified to positive voltage by diode D3 as described hereinbefore; and is applied to the base of TR2 causing that transistor to draw less current. With TR2 drawing less current over its emitter-to-ground connection (which includes resistance R7 and diode D1) the electrical resistance of D1 increases greatly from about 40 to several thousand ohms. With this increase in resistance, the former low 40 ohm shunt (virtually a short circuit) of D1 across R7 is now effectively removed and the resistance value of the sum of the parallel-connected R7 (1500 ohms) and the then high resistance of D1 (several thousand ohms) becomes additive to the emitter-to-ground circuit. Such an increase in resistance forces TR2 into a low gain condition thus aiding in effecting an automatic overall amplification gain control for Section C. Impulses induced into leads 28–29 will therefore remain at a selected constant value as described previously herein.

Circuitry of Sections C and E may now be examined in detail:

The common ground of the apparatus to which one terminal of X3S is connected by lead 15, the other terminal of that winding, lead 16, condenser C4, lead 16 to its connection with lead 18 which continues to a multiple connection with the base element of transistor TR2 and leads 17–42. One terminal of resistor R6 is connected to lead 16 and to the base element of TR2 by the lead 18 and the other terminal of that resistor is connected to the collector element of TR2 by the leads 19–20, the lead 20 also extending to a final connection with one terminal of the primary winding of coupling transformer X4, the other terminal of which is connected by lead 21 with the negative side of the common power supply. The emitter element of TR2 is connected to the common ground of the apparatus in a gain-selecting control means previously described. One terminal of the secondary winding of X4 is connected by lead 22 to the common ground, the other terminal being connected with lead 23. The lead 23 has condenser C5 in series connection and continues on to a juncture with lead 24, lead 31 and a final connection with the base element of TR3. Resistor R11 has one terminal connected to lead 24, the other being connected to lead 25, lead 26 to a final connection with the collector element of TR3 and with one terminal of the primary winding of output transformer X5, the other terminal of which is connected by lead 27 with the negative side N of the common power supply. The secondary winding of X5 has lead 28 connected to one terminal while lead 29 is connected to the other. The leads 28–29 extend to a connection with an associated communication circuit, as previously described. Resistor R10 is connected between the emitter element of TR3 and the common ground. Resistor R9 is connected between the base element of TR3 and the common ground.

SECTION E

*Rectifying section for automatic gain control of transmitting amplifier*

Lead 30, with resistor R24, condenser C12 and resistor R23 in series connection in that order, extends from a connection with lead 26 to the common ground. One terminal each of resistor R21 and the lead 48 is connected to lead 30 at a point between C12 and R23, the lead 48 continuing to a connection with the base element of transistor TR6. The other terminal of R21 is connected to lead 46 which continues to a juncture with lead 47, the latter lead being connected to the collector element of TR6 and to one terminal of the primary winding of coupling transformer X7, the other terminal of which is connected to the negative side of the common power supply by the lead 45. The emitter element of TR6 is connected to the common ground by the resistor R22. The secondary winding of X7 has one terminal connected by lead 44 to the common ground and the other to lead 18. Lead 18 has the negative side of rectified D3, its positive side then resistor R20 in series connection in the order stated and continues to a connection with lead 17 at a point between condenser C10 and resistor R19, the latter two components being in series connection with lead 17, between its terminal point connections with lead 18 and the common ground of the apparatus. Lead 43, with condenser C11 in series connection, extends from a connecting point with lead 18 between D3 and R20 to a final termination with the common ground.

SECTION D

*The automatic gain control for Section B*

Section D performs two primary functions, first, to aid the timely attenuation of Section C (accomplished primarily by resultant secondary action of Section F, described hereinafter) and second, to control the amplification gain of Section B. A selected portion of energy input to Section B via leads 4 and 5 is arranged to be conducted to Section D by leads 6, 8, variable resistor R12 and condenser C6, where it is then amplified by transistor TR4, rectified to negative D.C. by rectified D2, and applied to the base element of transistor TR5. This negative D.C., varying in value or amount in ratio to the magnitude of the signal energy input to the Section B means, causes a similar degree of response by transistor TR5. I thus cause TR5 to exercise a control or metering supervision over the amount of negative D.C. to be applied to the base element of TR1. The lead 41 connects the collector element of TR5 with lead 70, the latter extending between the negative side of the common power supply and the base element of TR1 and having the previously mentioned resistors R17–R18 in series connection therewith. Therefore, with application of negative D.C. to the base element of TR5 and the transition of that transistor to a fully conducting status, an effective electrical path is provided for the return to the common ground (positive) of the excessive negative D.C. power normally applied to the base element of TR1, namely, the negative side of the common power supply, one terminal of R17, the other terminal, lead 10, lead 41, the collector element of TR5, the emitter element and return to the common positive ground of the apparatus to close the circuit. Thus with the removal of excessive negative D.C. power from the base element of TR1 as above arranged, that transistor is transformed from a condition of near electrical saturation with sub-normal amplifying characteristics to a normal and fully amplifying status.

Impulses input to the apparatus via leads 4–5 fall within two general types. The first of these may be signal impulses of intelligence while the second type may be spurious impulses without intelligence, such as static, hiss and the so-called "white noise."

Spurious impulses are usually of lesser magnitude than are those of intelligence. This difference in value or magnitude is utilized by the invention to reject the spurious impulses and to permit acceptance of those of intelligence. The variable resistor R12 of Section B is provided to act as the gate or "threshold" in accepting or rejecting impulses and, in the case of those of intelligence, to subsequently permit their amplification as described previously herein, and their delivery to Section A and thence to the leads L1 and L2.

Since the adjustment of resistor R12 determines the acceptance or rejection of all impulses input via leads 4–5, and the determination is on the basis of magnitude of the impulse, Section D should be considered as operating in an "on-off" manner, as distinguished from a variable control. It is pointed out however, that the change "on-off-on-off," ad infinitum, is not only inaudible, but is essentially instantaneous, with the change taking place in a matter of a few micro-seconds.

Circuitry of the Section D portion of the FIGURE 1 drawing will now be examined in detail, viz, lead 6, lead 8, one terminal of variable resistor R12 which has its other terminal connected to the common ground of the apparatus, the adjustable contact of R12, lead 8, condenser C6, one terminal of lead 32, lead 8, one terminal of lead 33, lead 8, and one terminal of resistor R14, the other terminal of which is connected to the common ground. Lead 6 originates with a connection to one terminal of the secondary winding of X–1, the other terminal of which is connected to the common ground. The other terminal of lead 33 is connected with the base element of transistor TR4. The mentioned lead 32 with resistor R13 in series connection continues to a juncture with lead 34, one terminal of which is connected to the collector element of TR4 while the other is connected to one terminal of the primary winding of coupling transformer X6. The other terminal of that winding is connected by lead 35 to the negative side N of the common power supply. The emitter element of TR4 has one terminal each of resistor R15 and condenser C7 connected therewith while the other terminals of these latter components are connected to the common ground.

The secondary winding of X6 has one terminal connected by lead 36 to the common ground and lead 37 connected to the other. Lead 37 continues to a junction with lead 38 and the positive side of rectifier D2, the negative side of D2 being connected to lead 39 and resistor R16. Lead 39 with condenser C8 in series connection continues on to a connection with the common ground. The lead 37, connected to the other terminal of R16, continues to a juncture with lead 40, condenser C9, and terminates in a connection with the common ground. The other terminal of lead 40 is connected to the base element of transistor TR5, the emitter element of which is connected to the common ground. Lead 41 connects the collector element of TR5 to lead 10 which, with resistors R17 and R18 in series connection therewith, extends from a connection with the base element of TR1 to a connection with the negative side of the common power supply.

TR5 (Section D) is normally non-conducting and not drawing current (no negative bias) and in such condition cannot act to properly bias transistor TR1 by reducing the high negative saturating voltage then being applied to its base. When TR5 is caused to conduct and draw current (from negative bias voltage applied to its base from diode D2) the saturating excessive negative voltage is removed from the base of TR1 and the latter is thus biased properly to become fully conducting.

Section D (including transistor TR5 and its removal of excessive negative voltage from the base of TR1 of Section B) operates *only* from impulses of magnitude greater than the minimum level permitted to pass through the adjusted resistor R12—the "threshold" control. Negative voltage from diode D2 to the base of TR5 will never reach a value where saturation of TR5 will occur because of the selected values of D2 and R16. Consequently, TR5 begins to conduct and remains in that condition after the negative voltage from D2 reaches an arranged minimum value—this value being adjustable by resistor R12 acting as the "threshold"—rejecting weak and passing impulses above a selected magnitude.

Again, with TR1 removed from a condition of saturation by removal of excessive negative voltage from its base and thus conducting, the amplification gain of Section B then becomes controllable by variable resistor R3—the "volume control."

SECTION F

*Attenuation means for transmitting amplifier*

Section F causes timely attenuation of Section C whenever signal energy is input to Section B via the previously described leads 4–5 and is subsequently amplified by the latter arrangement to a magnitude greater than that of a selected value. The purpose of such attenuation is to restrict the designed functioning of Section C to those times when signal energy is input thereto via the leads L1 and L2 as described previously, and to maintain the Section C provision attenuated when signal energy greater than that of a selected magnitude is input via the leads 4, 5 to Section B and subsequently to Section A.

In Section F, the lead 38, with one terminal connected to lead 37, continues to the negative side of rectifier D4. Lead 49 is connected to the positive side of D4, to lead 50 and to one terminal of resistor R25. The other terminal of R25 has the lead 42 connected thereto, the latter continuing to an ultimate connection with the base element of TR2, Section C, by means of the series connected resistor R26, lead 42 and lead 18. The mentioned lead 50, with filter condenser C13 in series connection, continues from its juncture with lead 49 to a connection to the common ground. Lead 51 is connected to lead 42 at a point between R25 and R26 and, with filter condenser C14 in series connection therewith, continues from its juncture with lead 42 to a connection with the common ground.

By the means I have thus arranged the timely attenuation of Section C, said attenuation means being effective upon Section C prior to the restoration of transistor TR1 from a partially conducting or sub-normal amplifying condition to a normal and fully amplifiying status.

SECTION G

*Attenuation means for receiving amplifier*

Similarly to Section F, Section G causes a timely attenuation of the receiver or "input" amplifier, Section B, and the automatic gain control for that arrangement, the Section D provision. I have arranged the timely attenuation of both of these provisions by the Section G, said attenuation being effective whenever signal energy is input, by means provided, to the transmit or "output" amplifier, the Section C provision and amplified by that arrangement to a magnitude greater than that of a selected minimum value. The purpose of such attenuation is to restrict the designed functioning of the Sections B and D means to those times when signal energy is input to the Section B provision via leads 4–5 as previously described.

By reference to Section G, the pertinent arrangement may now be examined in detail, viz, the lead 56, connected at one terminal to lead 26 which conducts the output from TR3 to output transformer X5, and the other terminal of lead 56 which is connected to one terminal of condenser C17, the other terminal of C17, lead 52 to a common juncture with one terminal each of lead 55, lead 54 and resistor R26, lead 55 extending from its juncture with lead 56 to the positive side of rectifier D5, the negative side of which is connected to the common ground of the apparatus. The lead 54, with condenser C16 in series connection therewith, continues to a connection with the common ground. Leads 52 and 53 are jointly connected to the other terminal of R26, the lead 53 with condenser C15 in series connection therewith, contiues on to a connection with the common ground.

The lead 52 continues to a joint connection with lead 11 and one terminal of resistor R28, the other terminal of which is connected to the base element of transistor TR4. Lead 11, from its juncture with lead 52, continues to one terminal of resistor R27. Lead 11, connected to the other terminal of R27, terminates in a joint connection with lead 10 and the base element of transistor TR1.

The means provided are thus arranged to cause the timely attenuation of the Sections B and D provisions, said attenuation means being effective upon those provisions whenever signal energy is input to the Section C and amplified by that arrangement to a magnitude greater than that of a selected minimum value.

It will thus be seen that crosstalk and singing cannot occur because of first, the operating characteristics of Section A, and second, the attenuation of Section C responsive to receipt and amplification of impulse signals by Section B.

The electrical efficiency of a hybrid network such as Section A is rated in decibles of trans-hybrid loss with the efficiency being highest in circuits having the greatest trans-hybrid loss. Assume Section A to have a trans-hybrid loss of about 25 decibels. In terms of performance, this would mean that impulse signals from Section B induced into Section A (by transformer X2P–X2S) would have to be of a magnitude greater than the trans-hybrid loss of Section A before they would be effective upon Section C. For example, assume the output from Section B to Section A to be of a 26 db level, with the trans-hybid loss of Section A to be exactly 25 decibles. Under such conditions, an impulse of 1 db magnitude would then be induced into the secondary winding of transformer X3P–X3S and become effective upon Section C. The result would be that the signal impulse, amplified to a 26 db level by Section B would then be distributed by Section A, with 25 decibles going out over L1 and L2 and 1 db of the signals going into Section C and thence out over leads 28 and 29 as a very strong signal because of the 40 db gain of Section C. Crosstalk and/or singing would then result.

From the above it will be recognized that in spite of the very high efficiency of Section A, certain extremely strong signal impulses could ordinarily be effective on Section C and cause crosstalk or singing. To prevent this from ever occurring Section C is completely attenuated whenever impulse signals are being received and amplified by Section B, as hereinbefore described.

Thus, transistor TR2 of Section C is completely attenuated by application of positive voltage to its base. This positive voltage is supplied by rectifier D4 (Section F) from alternating current induced into the associated secondary winding of transformer X6 of Section D. The alternating current (signal impulses) is input to Section B via leads 4–5, conducted to and amplified by transistor TR4 (Section D) and subsequently supplied to rectifier D4. Transistor TR2 of Section C is arranged, by proper selection of component values, to be attenuated *prior to full* activation of transistor TR1 as previously described herein.

With the combination of a highly efficient hybrid circuit (Section A) and the attenuation of transistor TR2 of Section C whenever Section B is functioning, it is thus impossible for crosstalk or "singing" to develop.

It may be noted that the arrangement described provides an extremely compact device as compared to those heretofore conceived for similar purposes. In practice, it has been found that the entire structure can be housed in an area approximately 3" x 8" x 12". Further, the control panel for the structure is highly simplified, and would include only the following: (1) a volume control knob for the receiving amplifier, this knob being operamovable contact of resistor R–8 to selected positions; (3) a volume unit meter, this being the meter M and being calibrated as previously described herein; (4) a switch knob for the meter, having "receive," "send," and "off" settings, whereby the user can monitor either the incoming or outgoing signal as previously described; and (5) a "threshold" control knob, traversing a scale suitably calibrated as desired, as for example from zero to 30 in increments of 5, this knob being adapted to adjust the movable contact of resistor R–12 to selected positions.

As previously described, if the meter should show, for example, a volume unit reading of "white noise" in the receiving amplifier of —30, the user would adjust the "threshold" knob to —25. Then the "receive" volume control knob would be set to adjust the noise-free signal to the desired magnitude. Similarly, the "send" volume control knob is used to establish the magnitude of the transmitted signal, which in this case is automatically kept constant.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any change in construction that may be permitted within the scope of the appended claims.

I claim as my invention:

1. In a terminator of the type designed for application in a communications system to connect a terminal facility to the receiving and transmitting channels of said system, the combination, with a common power supply, of: a receiving amplifier including a signal-receiving line; a transmitting amplifier including a signal-transmitting line, said amplifiers respectively including amplifier circuits connected to said lines thereof; a connecting circuit common to both amplifiers and including input and output lines adapted for coupling to the associated terminal facility so as to provide a path of signal transmission between the terminal facility and the respective amplifiers, said connecting circuit including means effective upon each of said amplifiers to at least partially isolate the same from the other amplifier in the presence of signal transmission between the connecting circuit and said other amplifier, the amplifier circuit of the receiving amplifier including an amplifying transistor and further including resistor means connected between the base element of said transistor and said power supply, the value of said resistor means being selected to normally maintain the transistor in a partially conducting amplifying condition, said amplifying circuit of the receiving amplifier additionally including a variable resistor having a connection with the signal-receiving line; a rectifier circuit connected between the variable resistor and said common power supply, said variable resistor being manually settable in selective positions effective to permit the passage thereby only of signals above a correspondingly selected audio level, said rectifier circuit including means responding to the input of signal current thereto from the variable resistor to impress amplifying current through the common power supply upon said transistor, at a value effective for transition of the transistor to a fully conducting status; attenuation means for the transmitting amplifier including a rectifying network connected between the rectifier circuit and the amplifying circuit of the transmitting amplifier, and attenuating the signal of said amplifier circuit of the transmitting amplifier in the presence of signal energy in the receiving amplifier of a magnitude above said selected audio level; and attenuation means for the receiving amplifier and rectifier circuit, including a rectifying network connected between the transmitting amplifier and said receiving amplifier and rectifier circuit, arranged to attenuate the signal of the receiving amplifier and rectifier circuit in the presence of signal energy in the amplifying circuit of the transmitting amplifier, having a value above a preselected minimum magnitude.

2. The combination of claim 1, further including a second variable resistor in the amplifier circuit of the receiving circuit, connected in the path of current flowing from the signal-receiving line to said transistor and constituting manually operable gain control means effective for volume adjustment of transistor-amplified signal energy passing through the amplifier circuit of the receiving amplifier.

3. The combination of claim 1, further including a meter selectively connectable to said signal-receiving line to measure the magnitude of impulses present in the signal-receiving line, said meter being calibrated to provide a reading of said impulses in terms of volume units, the first-named variable resistor being selectively positioned at settings correspondingly identified in terms of volume units.

4. The combination of claim 3 wherein said meter is operable between positions in one of which it is connected to said signal-receiving line and in the other of which it has a connection to the signal-transmitting line of the transmitting amplifier for measuring, in terms of volume units, the signal energy emitted by the transmitting amplifier.

5. The combination of claim 4 wherein the meter includes three-position switching means operable between a position connecting the meter with said signal-receiving line, a neutral "off" position, and a position connecting the meter to the signal-transmitting line.

6. In an apparatus connectable between the terminal facility and the receiving and transmitting channels of a communications system, a transmitting amplifier and a receiving amplifier; a circuit connectable to said terminal facility and arranged to provide a common path of signal transmission for said amplifiers to and from said facility, said circuit including means effective upon each of said amplifiers to at least partially isolate the same from the other amplifier in the presence of signal transmission between the connecting circuit and said other amplifier, said amplifiers being separately coupled to said circuit, said transmitting amplifier including an output line for connection to said transmitting channel, and amplifying transistor means disposed in the path of signal transmission between said line and said circuit, said transistor means arranged for amplifying energy impressed thereon to a signal impulse of a value the magnitude of which bears a predetermined ratio to the value of the energy impressed upon the transistor means; a rectifier circuit connected between the output and input of the transistor means, and responding to the value of said transistor means output to in turn produce a response of the transistor means such that the value of the energy impressed upon the transistor means is in inverse proportion to the value of the signal impulses emitted by the transistor means, whereby to provide a transmitted signal of a selectively adjusted, unchanging magnitude; attenuation means for the transmitting amplifier including a rectifying network connected across the receiving and transmitting amplifiers and attenuating the signal of the transmitting amplifier in the presence of signal energy in the receiving amplifier of a magnitude above a predetermined audio level; and attenuation means for the receiving amplifier comprising a rectifying network connected across the receiving and transmitting amplifiers and arranged to attenuate the signal of the receiving amplifier in the presence of signal energy in the transmitting amplifier having a value above a preselected minimum magnitude.

7. An apparatus as in claim 6 wherein said transistor means includes a first transistor to which signal energy flows from the first-named circuit, and a second transistor to which signal energy flows from the first transistor for further amplification and transmission to the transmitting channel.

8. An apparatus as in claim 7 wherein said rectifier circuit is connected between the output of the second transistor and the input of the first transistor.

9. An apparatus as in claim 8 wherein said rectifier circuit includes a third transistor receiving for additional amplification a portion of the amplified energy from the second transistor having direct ratio to the total output of said second transistor.

10. An apparatus as in claim 9 wherein the rectifier circuit additionally includes a coupling transformer to which is conducted the output of the third transistor, and a diode coupled to the transformer and rectifying the current induced through the transformer to positive direct current.

References Cited by the Examiner

UNITED STATES PATENTS

| | | | |
|---|---|---|---|
| 1,853,070 | 4/32 | Mitchell | 179—170.8 |
| 1,859,565 | 5/32 | Keith | 330—53 |
| 1,866,592 | 7/32 | Bjornson | 179—170.8 |
| 2,043,403 | 6/36 | Wright et al. | 179—170 |

ROBERT H. ROSE, *Primary Examiner.*

WALTER L. LYNDE, *Examiner.*